Patented Mar. 19, 1935

1,994,927

UNITED STATES PATENT OFFICE 1,994,927

PROCESS OF PREPARING DIPHENYL DERIVATIVES

Robert L. Sibley, Nitro, W. Va., assignor to The Rubber Service Laboratories Company, Akron, Ohio, a corporation of Ohio No Drawing. Original application September 26, 1932, Serial No. 634,929. Divided and this application October 22, 1932, Serial No. 639,149

20 Claims. (Cl. 260—155)

The present invention relates to new compounds for increasing the wetting, penetrating and cleansing capacity of treatment liquids, particularly such as are employed in the textile, leather and rubber industries.

In general such liquids are effective largely on account of their effect on the interfacial tension between water and an oily or greasy surface. It is generally conceded that liquids having the greater surface tension have the least wetting-out power.

According to the present invention a new class of compounds has been discovered which possess to a large degree the property of reducing the surface tension of aqueous solutions, and which have been found to possess exceptional wetting, penetrating and cleansing properties.

The new class of materials possessing these desirable wetting, penetrating and cleansing properties comprise the sulphuric acid derivatives of the reaction products of an alcohol and a hydroxy substituted diphenyl or a salt thereof as, for example an alkali or ammonium salt.

The following example illustrates one method by which the preferred class of materials was prepared.

*Example I*

907 grams of a mixture of substantially 85% of ortho hydroxy diphenyl and 15% of para hydroxy diphenyl and 800 grams of normal butyl alcohol (the quantities of the hydroxy diphenyl and butyl alcohol employed above are in the ratio of substantially one molecular proportion of hydroxy diphenyl to a slight excess over two molecular proportions of butyl alcohol) were placed in a suitable reactor equipped with a reflux condenser and heated at refluxing temperature for substantially two hours. The reaction product so obtained was then allowed to cool to substantially 75° C., after which 4000 grams of 93% sulphuric acid was added slowly thereto at a temperature of substantially 75° to 85° C. After the addition of the sulphuric acid was completed, the resulting product was heated for a period of substantially four hours at a temperature of substantially 80° to 85° C. The product thus obtained was in the form of two layers, the upper layer of which was drawn off and diluted with water to a volume having a total weight of substantially 6000 grams. The charge was then heated to 90° to 95° C. and treated with sufficient freshly slaked lime to convert the free sulphuric acid present to calcium sulphate and to convert the sulphuric acid derivative of the reaction product of normal butyl alcohol and hydroxy substituted diphenyl to the calcium salt thereof. After filtering off the calcium sulphate formed by the liming treatment described, sufficient sodium carbonate, preferably as a concentrated solution thereof, was added to the filtrate to convert the calcium salt of the above described reaction product to the corresponding sodium salt. The calcium carbonate thereby precipitated was filtered off and the filtrate comprising an aqueous solution of one of the preferred materials, which may be called the sodium salt of the sulfonated normal butylated ortho-para hydroxy diphenyl, may, if desirable, be employed as a wetting, penetrating or cleansing agent according to the present invention, or if preferred the aqueous solution thereof may be partially concentrated or completely dried and employed in the form of a solid. Furthermore, other soluble salts than the sodium salt, for example, the potassium salt may be prepared and employed in the process according to the present invention. Again, the free sulphuric acid derivative described above has been neutralized direct with aqueous sodium hydroxide solution, thus simplifying the more complicated lime and soda ash method.

In order to show the wetting and penetrating effect of the new and preferred class of materials the following test was employed. A bundle of cotton or wool yarn composed of sixteen strands each two inches in length was placed on the surface of a one percent aqueous solution of the wetting or penetrating agent and the time required for the yarn to sink below the surface of the liquid is known as the wetting-out time.

A test carried out in the manner described showed a one percent solution of the sodium salt of the sulfonated normal butylated ortho-para hydroxy diphenyl prepared as in Example I wet wool and cotton in 1.8 and 2.2 seconds respectively. A test carried out in the same manner as indicated above with the exception that there was no wetting agent added to the water, showed substantially no wetting whatever of the cotton and wool test pieces.

As it is known that liquids that have the greatest surface tension have the least wetting-out power, a comparison showing the difference indicated between the surface tension of water and that of a one percent aqueous solution of the preferred materials was made. The method employed was essentially that described by A. J. Hall in the Textile Colorist, volume 48, (1926) pages 809 to 812 inclusive. The apparatus employed consisted in a pipette having attached thereto a piece of rubber tubing and a pinch clamp, and marked so as to show a volume between markings of 3 c. c. In comparing the surface tension of any two liquids, one liquid is drawn into the pipette and by adjustment of the pinch clamp is allowed to fall in drops from the lower end of the pipette at a regular rate and the number of drops which fall while the level of the liquid passes between the 3 c. c. markers at a temperature of 25° C. is noted. Under similar conditions, the number of drops which fall when the other liquid is in the pipette is also obtained. Then assuming that the specific gravities of the two liquids are the same (a correction can be made when this is not the case) the surface tensions are inversely proportional to the number of drops which fall. In the present specification comparisons showing the differences in surface tensions of the liquids are indicated by the number of drops which fall in the above test. This number of drops is hereinafter called the drop number.

A one percent aqueous solution of the sodium salt of the sulphonated normal butylated ortho-para hydroxy diphenyl was found in the test hereinbefore described to possess a drop number of 144, while water was found to possess a drop number of 61. It is thus apparent that the preferred class of materials possess characteristics which markedly lower the surface tension of liquids thus indicating their value as wetting and penetrating agents.

Other sulphuric acid derivatives, as well as the alkali salts thereof, of the reaction products of an alcohol and a hydroxy substituted diphenyl than that set forth in Example I have been prepared and the products so obtained found to possess the desirable wetting out characteristics of the class. Thus, the sodium salts of the following materials have been prepared in a manner analogous to that hereinbefore set forth.

A. The sulphuric acid derivative of the reaction product of iso-propyl alcohol and a mixture of substantially 85% ortho and substantially 15% para hydroxy diphenyl.

B. The sulphuric acid derivative of the reaction product of normal butyl alcohol and para-hydroxy diphenyl.

C. The sulphuric acid derivative of the reaction product of normal butyl alcohol and ortho hydroxy diphenyl.

D. The sulphuric acid derivative of the reaction product of iso-butyl alcohol and a mixture of substantially 85% ortho and substantially 15% para hydroxy diphenyl.

E. The sulphuric acid derivative of the reaction product of normal amyl alcohol and a mixture of substantially 85% ortho and substantially 15% para hydroxy diphenyl.

Tests carried out in the manner hereinbefore set forth showing the wetting-out time of one percent aqueous solutions of the above materials are given in the following table.

Table I

| Wetting agent | Wetting out time for cotton |
|---|---|
| | Seconds |
| A | 5.0 |
| B | 10.0 |
| C | 5.8 |
| D | 7.0 |
| E | 7.6 |

Drop numbers taken on the above solutions showed a marked lowering of the surface tension of the liquids.

Other examples of the preferred class of wetting, penetrating and cleansing agents that have been prepared and fall within the scope of the present invention comprise the free acid and the sodium salt of the sulphuric acid derivatives of the following materials: the reaction product of cyclohexanol and a mixture of substantially 85% ortho and substantially 15% para hydroxy diphenyl; the reaction product of benzyl alcohol and a mixture of substantially 85% ortho and substantially 15% para hydroxy diphenyl; the reaction product of octyl alcohol and a mixture of substantially 85% ortho and substantially 15% para hydroxy diphenyl.

The sulphuric acid derivative of the reaction product of normal butyl alcohol and the residue obtained from the distillation of crude phenol prepared by the benzene sulphonation-caustic fusion process, which residue is largely composed of hydroxy substituted diphenyl, also was found to possess the characteristic wetting-out properties of the preferred class of materials.

From the data hereinbefore set forth, it is readily apparent that the preferred class of materials has marked wetting and penetrating properties applicable for use in the textile, rubber and leather industries.

Tests have also been carried out which demonstrated that the sulphuric acid derivatives of the reaction product of an alcohol and a hydroxy substituted diphenyl possess marked cleansing properties.

By the term "hydroxy substituted diphenyl" as appearing in the present specification and claims is meant a compound comprising two benzene nuclei joined together through a single carbon atom of each by means of a single bond, said compound containing one or more hydroxy substituents. By the term "alkali metal" as appearing in the present specification and claims is meant lithium, sodium, potassium, rubidium, caesium and the ammonium radical $NH_4$.

The present application is a division of my prior application Serial No. 634,929, filed September 26, 1932.

What is claimed is:

1. The sulphuric acid derivatives of the reaction products of a monohydric alcohol and a nuclear hydroxy substituted diphenyl and their alkali metal and alkaline earth salts.

2. An alkali metal salt of the sulphuric acid derivative of the reaction product of a monohydric alcohol and a nuclear hydroxy substituted diphenyl.

3. An alkali metal salt of the sulphuric acid derivative of the reaction product of an aliphatic monohydric alcohol and a nuclear hydroxy substituted diphenyl.

4. An alkali metal salt of the sulphuric acid derivative of the reaction product of butyl alcohol and a nuclear hydroxy substituted diphenyl.

5. An alkali metal salt of the sulphuric acid derivative of the reaction product of normal butyl alcohol and an ortho hydroxy substituted diphenyl.

6. The sodium salt of the sulphuric acid derivative of the reaction product of normal butyl alcohol and ortho hydroxy diphenyl.

7. The sodium salt of the sulphuric acid derivative of the reaction product of normal butyl alcohol and a mixture of ortho and para hydroxy diphenyl.

8. The sodium salt of the sulphuric acid derivative of the reaction product of normal butyl alcohol and a mixture of substantially 85% ortho hydroxy diphenyl and substantially 15% para hydroxy diphenyl.

9. The sodium salt of a sulphonated butylated mixture of ortho hydroxy diphenyl and para hydroxy diphenyl.

10. A process for the preparation of a diphenyl derivative comprising reacting a nuclear hydroxy substituted diphenyl with a monohydric alcohol and further reacting the product so formed with sulphuric acid.

11. A process for the preparation of a diphenyl derivative comprising heating a nuclear hydroxy substituted diphenyl with an aliphatic monohydric alcohol and further reacting the product so formed with sulphuric acid.

12. A process for the preparation of a diphenyl derivative comprising heating a nuclear hydroxy substituted diphenyl with butyl alcohol and further reacting the product so formed with sulphuric acid.

13. A process for the preparation of a diphenyl derivative comprising heating a nuclear hydroxy substituted diphenyl with normal butyl alcohol and further reacting the product so formed with sulphuric acid.

14. A process for the preparation of a diphenyl derivative comprising heating ortho hydroxy diphenyl with normal butyl alcohol and further reacting the product so formed with sulphuric acid.

15. A process for the preparation of a diphenyl derivative comprising heating a nuclear hydroxy substituted diphenyl with an aliphatic monohydric alcohol, further reacting the product so formed with sulphuric acid and isolating the diphenyl derivative thus produced as the alkali metal salt thereof.

16. A process for the preparation of a diphenyl derivative comprising heating a nuclear hydroxy substituted diphenyl with butyl alcohol, further reacting the product so formed with sulphuric acid and isolating the diphenyl derivative thus produced as the alkali metal salt thereof.

17. A process for the preparation of a diphenyl derivative comprising heating ortho hydroxy diphenyl with normal butyl alcohol, further reacting the product so formed with sulphuric acid and isolating the diphenyl derivative thus produced as the alkali metal salt thereof.

18. A process for the preparation of a diphenyl derivative comprising heating normal butyl alcohol and a mixture of ortho and para hydroxy diphenyl, further reacting the product so formed with sulphuric acid and isolating the diphenyl derivative thus produced as the alkali metal salt thereof.

19. A process for the preparation of a diphenyl derivative comprising heating normal butyl alcohol and a mixture of substantially 85% ortho hydroxy diphenyl and substantially 15% para hydroxy diphenyl, further reacting the product so formed with sulphuric acid and isolating the diphenyl derivative thus produced as the sodium salt thereof.

20. A process for the preparation of a diphenyl derivative comprising heating substantially two molecular proportions of normal butyl alcohol and substantially one molecular proportion of a mixture of substantially 85% of ortho hydroxy diphenyl and substantially 15% of para hydroxy diphenyl at refluxing temperature, adding concentrated sulphuric acid thereto at a temperature of substantially 75° to 85° C., separating the sulphuric acid derivative of the reaction product of normal butyl alcohol and the mixture of ortho and para hydroxy diphenyls thus formed and converting it to the sodium salt.

ROBERT L. SIBLEY.